H. G. BALDWIN.
INTERNAL COMBUSTION ENGINE.
APPLICATION FILED MAR. 5, 1913.
1,116,535.
Patented Nov. 10, 1914.
3 SHEETS—SHEET 1.
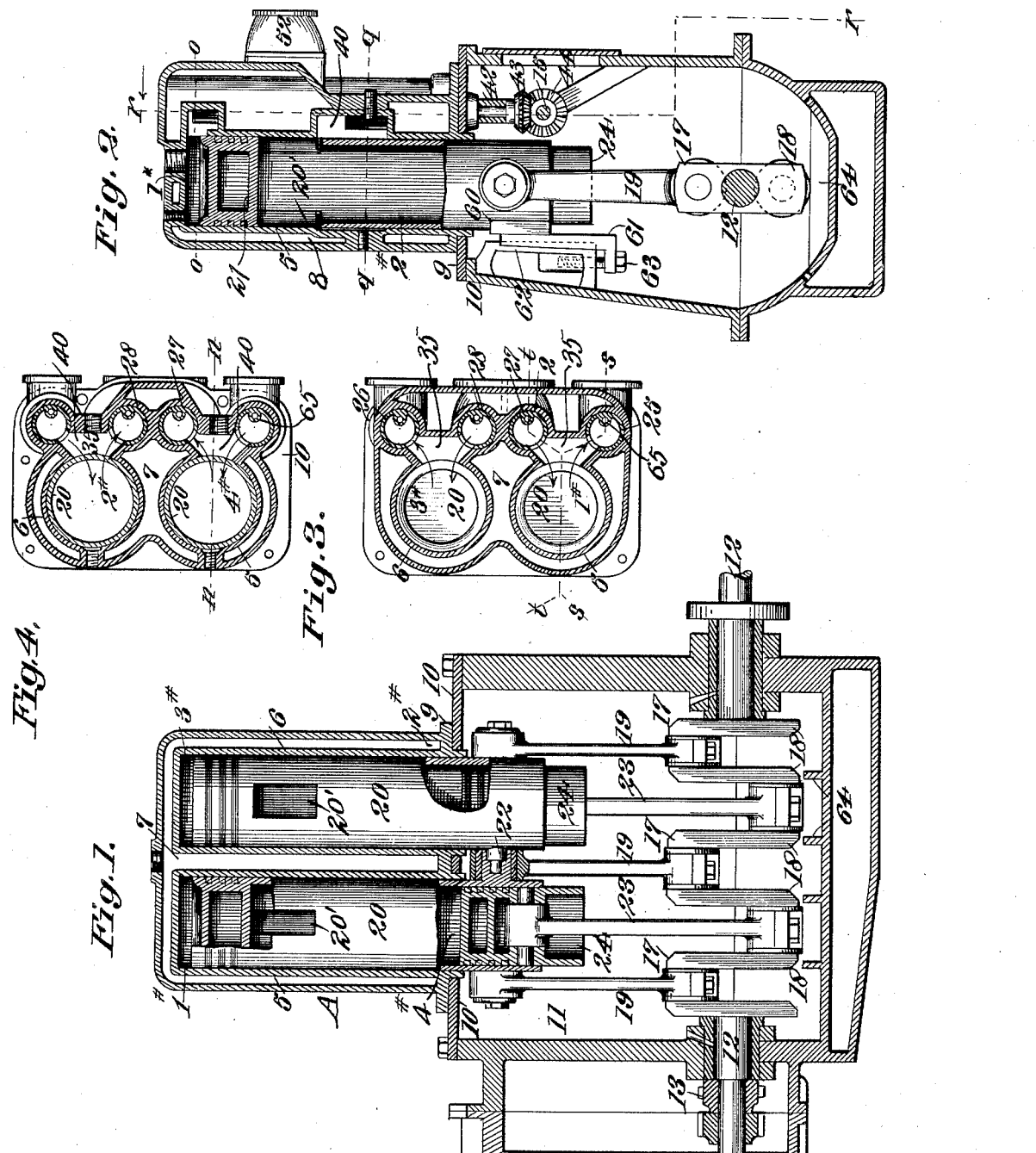
WITNESSES:
Charles Pickles
F. E. Maynard
INVENTOR
Henry G. Baldwin,
BY G. H. Strong.
ATTORNEY

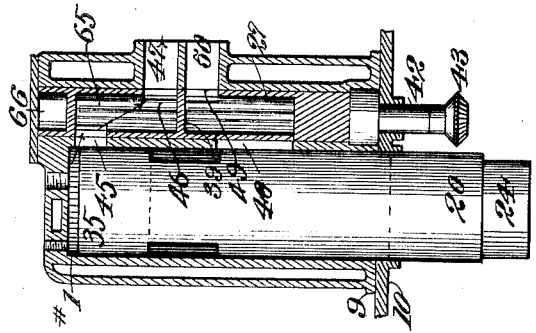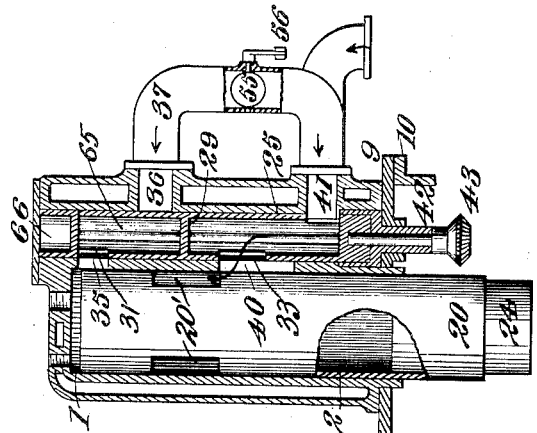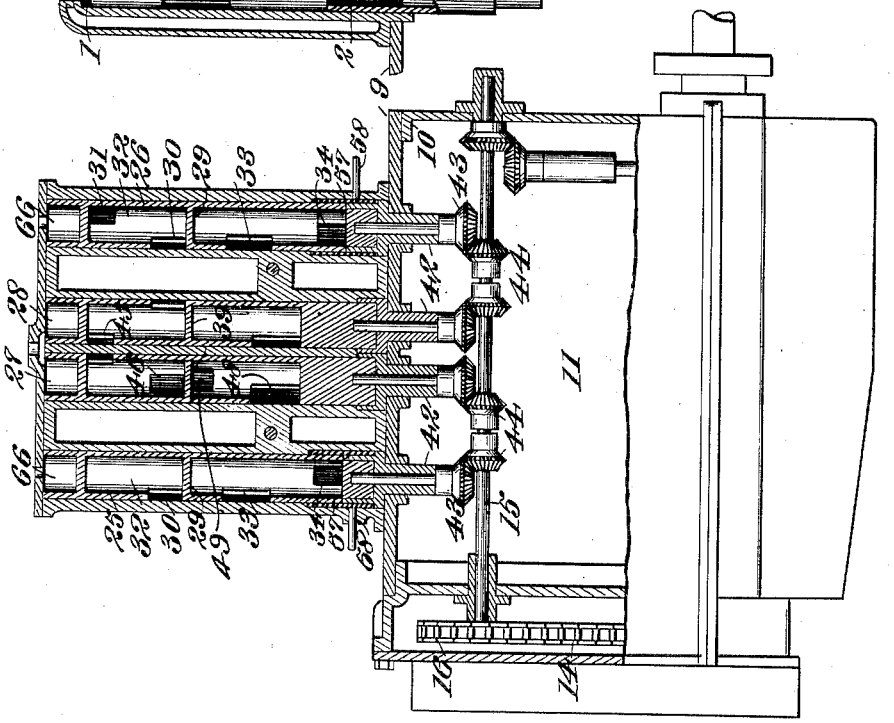

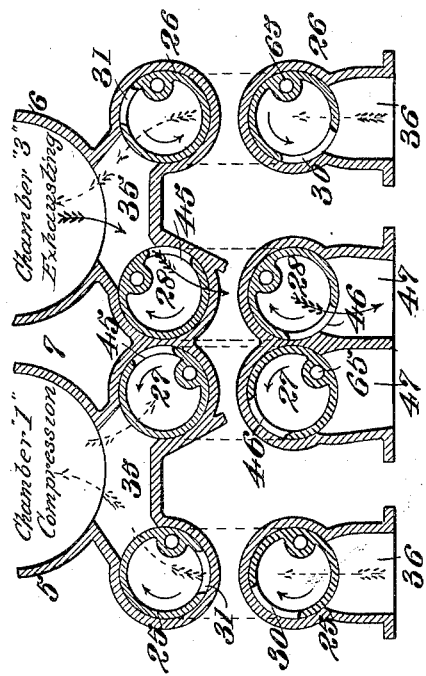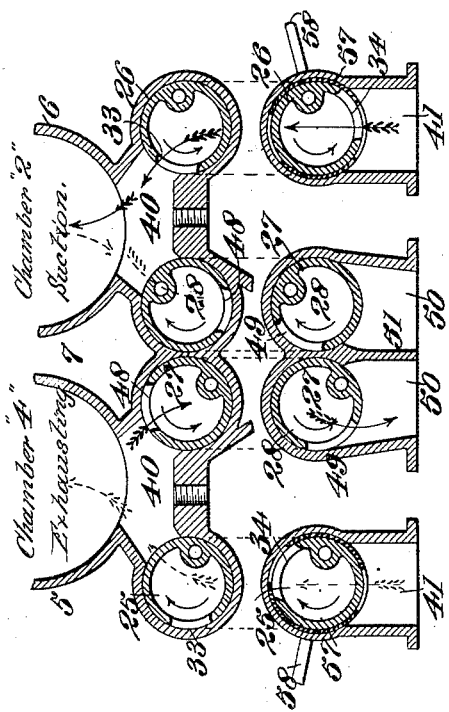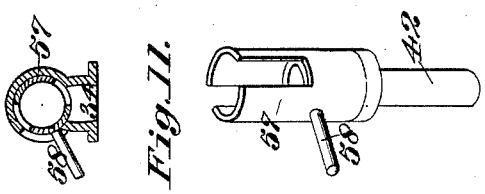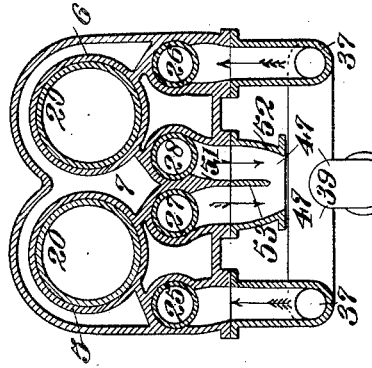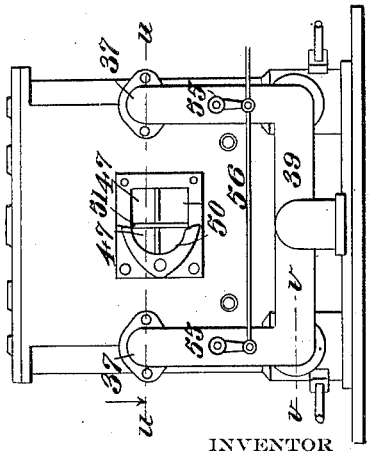

UNITED STATES PATENT OFFICE.

HENRY G. BALDWIN, OF SAN FRANCISCO, CALIFORNIA.

INTERNAL-COMBUSTION ENGINE.

1,116,535.　　　　Specification of Letters Patent.　　Patented Nov. 10, 1914.

Application filed March 5, 1913. Serial No. 752,017.

*To all whom it may concern:*

Be it known that I, HENRY G. BALDWIN, a citizen of the United States, residing in the city and county of San Francisco and State of California, have invented new and useful Improvements in Internal - Combustion Engines, of which the following is a specification.

This invention relates to explosive engines and particularly to internal combustion engines of the four-cycle type.

It is well known that the thermal and mechanical efficiency of internal combustion engines is very low, and it is among the principal objects of the present invention to so design, construct, arrange and proportion the same that a material increase in thermal and mechanical efficiency is obtained. This increase in efficiency is produced by the provision of means directly calculated to remedy the usual defects, thermal and mechanical, of ordinary reciprocating explosive engines.

In accomplishing the purposes of the present invention, I have evolved a structure in which I obtain a plurality of explosion chambers, and, while increasing the power of the engine, decrease over the ordinary engine the number of cylinders, eliminate reciprocating valves, and provide rotary valves of peculiar design and construction. The principal function of the valves is to provide ample area for the free eduction of gases, thereby reducing the vacuum in the explosion chambers on the suction stroke and with a proportionate and consequent increase of efficiency. I provide further an engine having its parts so designed and proportioned that the loss of efficiency, through the radiation of heat into the cylinder walls, is greatly reduced and conversely increases the efficiency of the engine during the compression and expansion stroke, the reciprocating parts being designed to operate at a greater speed.

A further object is to provide a novel means for reducing the wear of the engine cylinder due to the lateral or side thrust of the operating piston under reaction.

Another object of the invention is to provide an internal combustion engine of the explosive type, wherein the residue burned gases in the clearance of the explosion chamber is materially reduced and its reexpansion eliminated, the beneficial effect of which is that a larger volume of rich fuel will be admitted to the combustion chamber of the engine with a consequent increase in efficiency. The incoming charge of fuel following the suction stroke is kept nearer atmospheric pressure by reason of the provision of the peculiar valves offering a minimum resistance to the inflowing fuel; the residue burned gases, after an explosion, being effectually diminished and attenuated by a novel arrangement of the exhaust ports of the engine, the function of which arrangement is to cause an ejection effect at each exhaust period, this effect influencing the residue burned gases in the immediately preceding exhausting chamber.

A further object of the present invention is to devise and provide an internal combustion engine of the reciprocating type having a plurality of axially alined explosion chambers within a single cylinder, to arrange a plurality of peculiar pistons within the cylinder, and to so connect said pistons to the crank-shaft of the engine that an increase of leverage of the pistons is transmitted to the crank-shaft and that the force of an explosion in one of the explosion chambers is applied simultaneously to opposed cranks with a resultant increase of leverage.

It is also an object to provide an improved internal combustion engine involving a reciprocating piston having a single head, on opposite sides of which explosions may alternately occur, said piston being connected to the crank-shaft for driving the same; and also to provide in combination with said piston an oppositely reciprocating piston connected to the crank-shaft in such relation that an expansive force reacting against the oppositely moving or opposed axial pistons will act simultaneously on opposed cranks throughout the expansion stroke of the opposed pistons.

The invention consists of the parts and the construction and combination of parts as hereinafter more fully described and claimed, having reference to the accompanying drawings, in which—

Figure 1 is a vertical longitudinal section through the engine. Fig. 2 is a transverse vertical section on line *n—n* of Fig. 4. Fig. 3 is a transverse section through the cylinders of the engine on line *o—o*, Fig. 2. Fig. 4 is a tranverse horizontal section on line *q—q*, Fig. 2. Fig. 5 is a vertical section on the line *r—r*, Fig. 2. Fig. 6 is a transverse vertical section through the cylinders of the engine on line s—s, Fig. 3. Fig. 7 is a similar section on line t—t, Fig. 3. Fig. 8 is a side elevation of the engine showing the inlet and discharge arrangement. Fig. 9 is a horizontal section on line u—u, Fig. 8. Fig. 10 is a detail horizontal section on line v—v, Fig. 8. Fig. 11 is a perspective view of one of the throttles of the lower combustion chambers. Fig. 12 is a diagrammatic view representing a series of sections through horizontal planes of the inlet and exhaust valves of the upper and lower explosion chambers.

In the following specification the reference characters designated #1, #2, #3, and #4 will be used for the purpose of identifying explosion chambers, as clearly represented in Fig. 1, in which explosions will occur in the operation of the engine in the serial order designated.

The engine consists of a suitable cylinder block A, in which, in the present engine, there are formed two cylinders 5 and 6. The cylinders 5 and 6 are sufficiently spaced to permit the formation of a water chamber 7 at their adjacent surfaces. The block A includes a water jacket 8 and has a flange 9 resting upon and bolted to a top plate 10 of a crank case 11, in which is appropriately mounted a crank-shaft 12. On one end of the crank-shaft 12 is secured a suitable gear or sprocket-wheel 13 for transmitting power, in this instance by a chain 14, to a timing shaft 15, on which is mounted a gear or sprocket 16, the speed ratio of the crank-shaft to that of the timing shaft 15 being two to one, that is, the timing shaft making one revolution for two of the crank-shaft. The crank shaft is shown as provided with a series of cranks 17 in a common plane on one side of the crank-shaft, diametrically opposed to which is a set of cranks 18. The cranks 17 are connected by connecting-rods 19 to the lower, downwardly projecting ends of outer or sleeve pistons 20 reciprocal in the cylinders 5 and 6 and having heads 21 above which are respectively formed combustion chambers #1 and #3. I have shown the pistons 20 as connected by studs 22, upon one of which is journaled the upper end of the central connecting-rod 19, so that a nice balance of the pistons 20 and the crank-shaft is obtained to prevent undue side thrusts of the pistons 20. The intermediate cranks 18 are connected by respective connecting-rods 23 to inner pistons 24 having a running fit with the interior of the outer pistons 20, and since I have shown the throw of the cranks 17 and 18 as equal, it will be seen that the piston heads 21 will move an equal distance upwardly with the simultaneous movement downwardly of the inner pistons 24; this opposite movement of the concentric pistons 20—24 being obtained under the propelling force of an explosion produced in the chambers formed between the piston heads 21 and their respective concentric opposed pistons 24. By this peculiar arrangement of the outer and inner concentric pistons 20—24 and their connection with opposed cranks, it will be seen that during the force of an explosion in the explosion chambers #2 and #4, between the piston heads, the connecting-rods 19 and 23 will each exert a moving force on their respective cranks so that the effect of an increase of leverage on the crank-shaft is produced. The pistons 20 move simultaneously upward while the pistons 24 move simultaneously oppositely or downwardly and vice versa during the operation of the engine. The mechanical, beneficial effect of providing the oppositely movable pistons 20 and 24 is not only in the application of the expansive force of an explosion to the crank-shaft 12 simultaneously at opposed cranks, but also to increase the thermal efficiency of the engine because of the rapid utilization of the heat engendered by the explosion of an explosive fuel in the chambers #2 and #4. The heat is prevented from radiating into the cylinder walls because of the rapid expansion of the explosive gases between the oppositely moving pistons 20 and 24, each of which has its full stroke equivalent to the throw of the crank, and the added stroke of the two pistons 20 and 24 is equal to twice the throw of the cranks.

For the improvement in the operation of internal combustion engines and a further increase of their efficiency, I have provided a series of novel valves for the admission of fuel and the eduction of burned gases to and from the explosion chambers of the engine so that the flow of the gases will be retarded as little as possible, giving a consequent increase of efficiency in the nature and volume of an explosive charge and allowing a more thorough expulsion of the burned gases with consequential benefits. In evolving this improvement in valves I provide also a novel arrangement of ports for the induction and eduction of gases as follows: Having provided explosion chambers #1 and #3 at the top of the cylinders 5—6 and above the piston heads 21, and also having provided other explosion chambers #2 and #4 below the piston heads 21 and above the respective axial pistons 24, it is essential that separate inlet ports, passages and valves be provided for each of the explosion chambers. This can be understood by the description of one set of inlet and exhaust valves for one of the superposed sets of explosion chambers, as #1 and #4.

Referring to Figs. 5, 6 and 7. there will be observed a series of inlet valves 25 and 26, arranged between which are exhaust valves 27 and 28. All of the valves are of tubular or sleeve-like form and each has a transverse diaphragm 29 dividing it into upper and lower chambers respectively. The outermost valves 25 and 26 form inlet valves and have apertures 30 and 31 leading from their upper chambers 32 and other apertures 33 and 34 leading from their lower chambers, above and below their respective diaphragms 29. The upper ports or apertures 31 of the inlet valves are adapted to be rotated into registration with intermediate chambers 35 formed adjacent to the top of, and communicating with, explosion chambers #1 and #3, and the lower ports 30 of the inlet valves are adapted to be turned into registration with inlet passages 36 formed in the jacket A and which communicate with the upper extensions or ends 37 of a feed manifold 39. The feed manifold 39 may receive a supply of combustible fuel from any suitable generator (not shown). The port 33 of each of the inlet valves is adapted to be turned into registration with its respective inlet port 40 communicating with its respective combustion chamber #2 or #4, while the lowermost ports 34 in the inlet valves are adapted to be turned into register with inlet passages 41 communicating with the manifold 39. Each of the valves 25, 26, 27 and 28 has secured at its lower portion a downwardly projecting spindle or shaft 42, to which is secured a pinion 43; the several pinions 43 meshing with pinions 44 of equal size with the pinions 43. The pinions 44 are secured upon the timing shaft 15 and are so set as to give the desired direction of rotation to the several valves. During the operation of the engine through means of the timing shaft 15, the inlet valves 25 and 26 will be rotated in proper time and present their respective ports for registration with coöperative pasageways for the inlet of fuel from the manifold 39 into the several combustion chambers #1, #2, #3 and #4. Since I employ rotary valves for the inlet of gases, and these valves are of considerable length in proportion to their diameters, an ample running surface is provided which will effectually prevent the escape of compressed gases during the operation of the engine. This will result in an increase in efficiency in the rapidity and effectiveness of compression of the gases. A further and important advantage of the valves that I have devised is that they can be opened and closed in ample time for the admission and passage of a fuel gas with the least possible resistance, thus enabling the suction stroke of the engine to be kept at a higher pressure than is possible with any type of valve offering mechanical resistance to the flow of air. It is one of the objects of my invention to increase the suction efficiency and reduce the resistance of the parts during the suction stroke, thereby obtaining a higher absolute pressure in the explosion chambers during the suction period. The several exhaust valves 27 and 28 are arranged between the inlet valves 25 and 26; the exhaust valves being of similar construction and each having upper and lower chambers formed by its transverse diaphragm 29, above and below which each of the valves is provided with a port for the eduction of gases from the combustion chamber. In the upper chamber of an exhaust valve is formed an uppermost port 45 adapted to rotate into register with one or the other of the intermediate chambers 35, as the case may be, and when the exhaust valve has been turned to bring the port 45 into register with the chamber 35 communicating with one of the explosion chambers, the spent gases will issue from the chamber 35, pass the port 45, and enter the upper chamber. From the upper chamber the spent gases will escape through a lower port 46, in the upper chamber of the exhaust valve, which port is adapted to be brought at appropriate time into registration with an exhaust passageway 47. The lower chamber of the exhaust valve is also provided with a lowermost vent port 48 registering with a respective intermediate chamber, 40, of one of the lower explosion chambers #2 or #4, as the case may be, from which gases will issue through the lowermost port 48 and travel upwardly through the lower chamber of the exhaust port and issue through an escape port 49 adapted for registration with a passageway 50, which is here shown as immediately below the upper passageway 47. The exhaust valves are arranged to open 40° early and to close 10° late in each instance, so that there is an overlap open position of 25° between the valves, each valve being open for 210° movement of the fly-wheel.

In the present engine I have shown two parallel piston cylinders, 5 and 6, and it is one of the purposes of the invention to utilize the velocity of the escaping gases through the escape ports 47—50 of the engine for the purpose of producing a suction effect between one another, particularly at such times as any two of the exhaust ports 46—49 of the several valves 27 and 28 may be coincidently open. To accomplish this action I have grouped the several escape passages 47—50 of each cylinder 5—6, as clearly shown in Fig. 8, in a compact area; each of the escape ports 47—50, of which there is a total of four shown, being divided by a web or partition 51.

By mounting upon the side of the engine, Fig. 9, a contracted tube 52 having a central web 53, the suction effect of the outrushing gases is made to apply equally, as between all of the several ports 47—47 and 50—50, when any one of the exhaust valves is turned to permit the escape of gases from a combustion chamber. I arrange the timing of the exhausts from the engine so that there will be at certain periods during the cycle of operation, at least two of the exhaust valves having exhaust ports in open communication with the escape passageways 47—50 at one time. The consequence is that while one of the pistons may be exhausting its explosion chamber for the expulsion of burned gases as this particular piston approaches the completion of the exhaust stroke, another of the exhaust valves will be turned into position to exhaust an explosion chamber, the initial high velocity of the escape of gas from which will produce an ejective action as it rushes past the web 53. The effect of this action will be to draw or suck burned gases from the nearly exhausted, previously opened explosion chamber.

The important beneficial effect of the ejective action of a high velocity exhaust gas on a previously opened, and not as yet closed, explosion chamber is that the quantity of burned gases will be greatly diminished in said chamber, thus being so decreased in volume that as its piston starts the downward or suction stroke the volume of burned gases will have been so decreased that its re-expansion will be of greatly less deleterious effect in obstructing the incoming fresh charge of fuel. By my arrangement the suction effect of the ejective action of the velocity of escaping exhaust gases tends to reduce the pressure of the immediately preceding exhausting cylinder; the ideal being to approach atmospheric pressure in the clearance space in the exhausting chamber as nearly as possible, and to enable the suction stroke of the piston to begin at and maintain atmospheric pressure as nearly as possible throughout its suction stroke, since the maintenance of a partial vacuum in the suction period of the cycle is a reduction in the efficiency of the engine on the return or compression stroke.

I have shown the outer pistons 20—20 as provided with apertures 20' at diametrically opposite locations; these apertures being for the purpose of permitting the entrance and exhaust of gases from the intermediate chambers 40 and also for the purpose of balancing the pressure of the gases on the side surfaces of the pistons 20 to prevent undue side thrust, as would be the case if only one entrance aperture 20' was provided in a piston 20. These apertures are preferably of such length that at no time is the communication between the interior explosion chamber #2 or #4 entirely cut off from the respective intermediate chambers 40.

Inasmuch as I have provided two distinct sets of explosion chambers, i. e., the upper set #1 and #3 and the lower set #2 and #4, it is desirable that the admission of fuel gas to each of these sets of explosion chambers be controlled independently, thus enabling me to obtain the most efficiency from the operation of the engine as the conditions to be met may require. For that purpose I have shown the manifold 39 as having in its arms 37 throttle valves 55 which are connected for simultaneous operation by a suitable link and lever mechanism 56, whereby the operator may nicely control the throttle valves 55 for varying the volume of fuel admitted to the upper explosion chambers #1 and #3. For the independent throttling of the lower combustion chambers #2 and #4 I have provided a throttling mechanism, shown in Figs. 10 and 11 as comprising arcuate slides 57, fitting externally upon the lower portions of the inlet valves 25 and 26 and adapted to be moved angularly by levers 58 to open or close the inlet ports 34 of said valves, as may be desired. The slides 57 are adapted for adjustment over the front of the valves to intercept the inflow of fuel gas through the respective passages 41, at the lower portion of the engine block, and to which is secured the contiguous portion of the manifold 39.

For the purpose of reducing the wear of the reciprocating pistons in their respective chambers 5 and 6, because of the side thrust on the pistons, in operation, I have provided the external surfaces of the pistons 20 at one side with flat wearing slides 60, against which may be adjusted wedge gibs 61, adjustable upon a complementary bearing 62 formed on the interior of the engine crank case 11; the adjustment of the gibs 61 being provided for and accomplished by means of adjusting screws 63. By this means the tremendous side thrust of the pistons 20 against one of the sets of their respective cylinders can be substantially eliminated, as all of the thrust is taken up by the adjustable, renewable thrust gibs 61.

It is manifest that suitable means may be employed for the efficient oiling of the several parts of the engine which will be of the splash type. The lower portion of the crank case 11 is provided with suitable basins 64 for catching and retaining a bath of oil into which the cranks will sweep. For the purpose of effectually oiling the rotary valves 25, 26, 27 and 28 each of these is provided with a vertical duct 65 opening at the upper end of the valves into an oil pocket or cup 66, the ducts conveying the oil downwardly to the lower portions of the several valves.

Having thus described my invention, what I claim and desire to secure by Letters Patent is—

1. In an internal combustion engine, the combination, with a cylinder, and concentric outer and inner pistons movable therein, the spaces between the upper end of said cylinder and the head of the outer piston and between said piston head and the head of the inner piston constituting upper and lower explosion chambers, respectively, and the said outer piston having a port for communication with the lower chamber; of an inlet valve and an exhaust valve each having upper and lower passages for communication respectively, with the upper explosion chamber and with said port; and means for operating said valves.

2. In an internal combustion engine, the combination, with a cylinder having upper and lower chambers at one side thereof, and concentric outer and inner pistons movable in said cylinder, the spaces between the upper end of the cylinder, and the head of the outer piston and between said piston head and the head of the inner piston constituting upper and lower explosion chambers, respectively, and the said outer piston having a port adapted to connect the lower first-named chamber and the lower explosion chamber; of an inlet valve and an exhaust valve each having upper and lower passages for communicating, respectively, with the upper and lower first-named chambers; and means for operating said valves.

3. In an internal combustion engine, the combination, with a cylinder having upper and lower chambers at one side thereof, and concentric outer and inner pistons movable in said cylinder, the spaces between the upper end of the cylinder and the head of the outer piston and between said piston head and the head of the inner piston constituting upper and lower explosion chambers, respectively, and the said outer piston having a port adapted to connect the lower first named chamber and the lower explosion chamber; of a rotary inlet valve and a rotary exhaust valve each having upper and lower passages for communicating, respectively, with the upper and lower first-named chamber; and means for operating said valves.

4. In an internal combustion engine, the combination, with a cylinder, and concentric outer and inner pistons movable therein, the spaces between the upper end of said cylinder and the head of the outer piston and between said piston head and the head of the inner piston constituting upper and lower explosion chambers, respectively; of an inlet valve and an exhaust valve each having upper and lower passages for communication, respectively, with the upper and lower explosion chambers; and means for operating said valves.

5. In an internal combustion engine, the combination, with a cylinder, and concentric outer and inner pistons movable therein, the spaces between the upper end of said cylinder and the head of the outer piston and between said piston head and the head of the inner piston constituting upper and lower explosion chambers, respectively; of a rotary inlet valve and a rotary exhaust valve each having upper and lower passages for communication, respectively, with the upper explosion chamber and with said port; and means for operating said valves.

6. In an internal combustion engine, the combination, with a cylinder, the wall of which is provided with upper and lower ports, and concentric outer and inner pistons movable in opposite directions in said cylinder, the spaces between the upper end of said cylinder and the head of the outer piston and between said head and the head of the inner piston constituting upper and lower explosion chambers in communication with the respective ports; of an inlet and an exhaust valve each having an upper portion adapted to control the upper cylinder port and a lower portion adapted to control the lower cylinder port, and means for operating said valves.

7. In an internal combustion engine, the combination, with a cylinder, the wall of which is provided with upper and lower ports, and concentric outer and inner pistons movable in opposite directions in said cylinder, the spaces between the upper end of said cylinder and the head of the inner piston constituting upper and lower explosion chambers in communication with the respective ports; of a rotary inlet valve and a rotary exhaust valve each having an upper portion adapted to control the upper cylinder port and a lower portion adapted to control the lower cylinder port, and means for operating said valves.

In testimony whereof I have hereunto set my hand in the presence of two subscribing witnesses.

HENRY G. BALDWIN.

Witnesses:
  W. W. HEALEY,
  ZOE HARRISON.